Jan. 19, 1943.  W. D. TIPTON  2,308,839
INTERNAL COMBUSTION ENGINE
Filed Sept. 21, 1942  4 Sheets-Sheet 1

Inventor
William D. Tipton
By Raymond W. Colton
Attorney

Jan. 19, 1943.	W. D. TIPTON	2,308,839
INTERNAL COMBUSTION ENGINE
Filed Sept. 21, 1942	4 Sheets-Sheet 2

Inventor
William D. Tipton
By Raymond W. Colton
Attorney

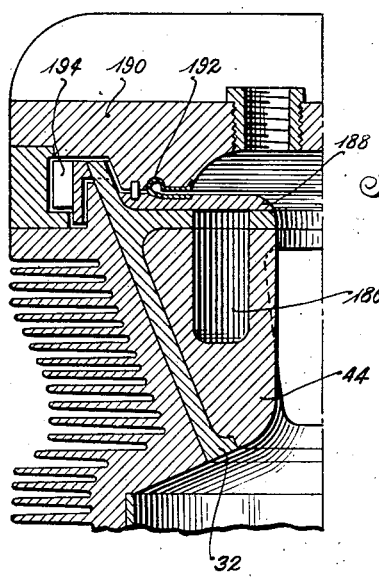
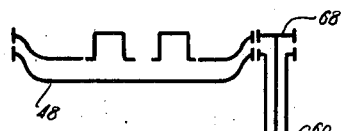
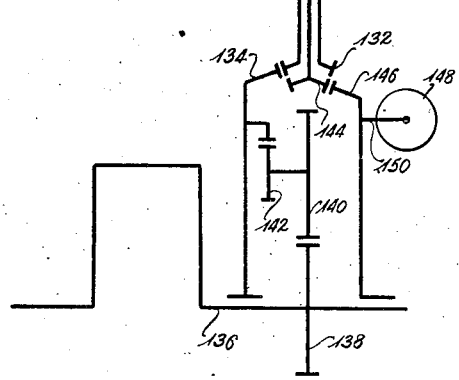
Fig. 6.
Fig. 7.
Fig. 8.
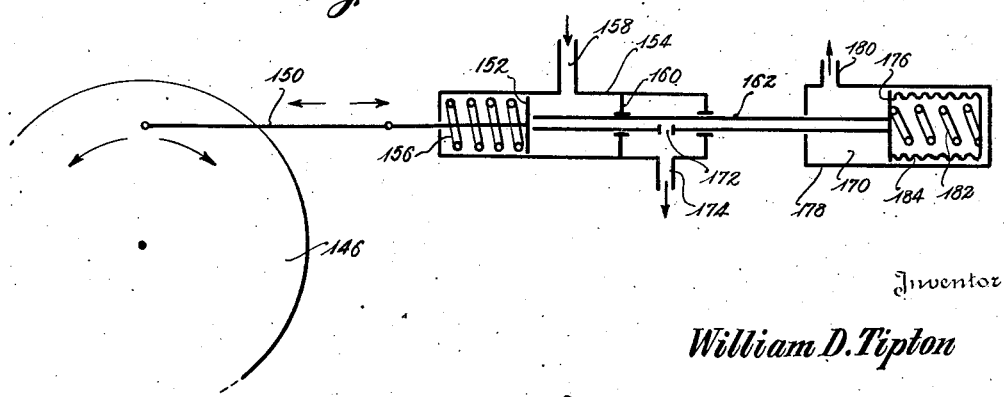

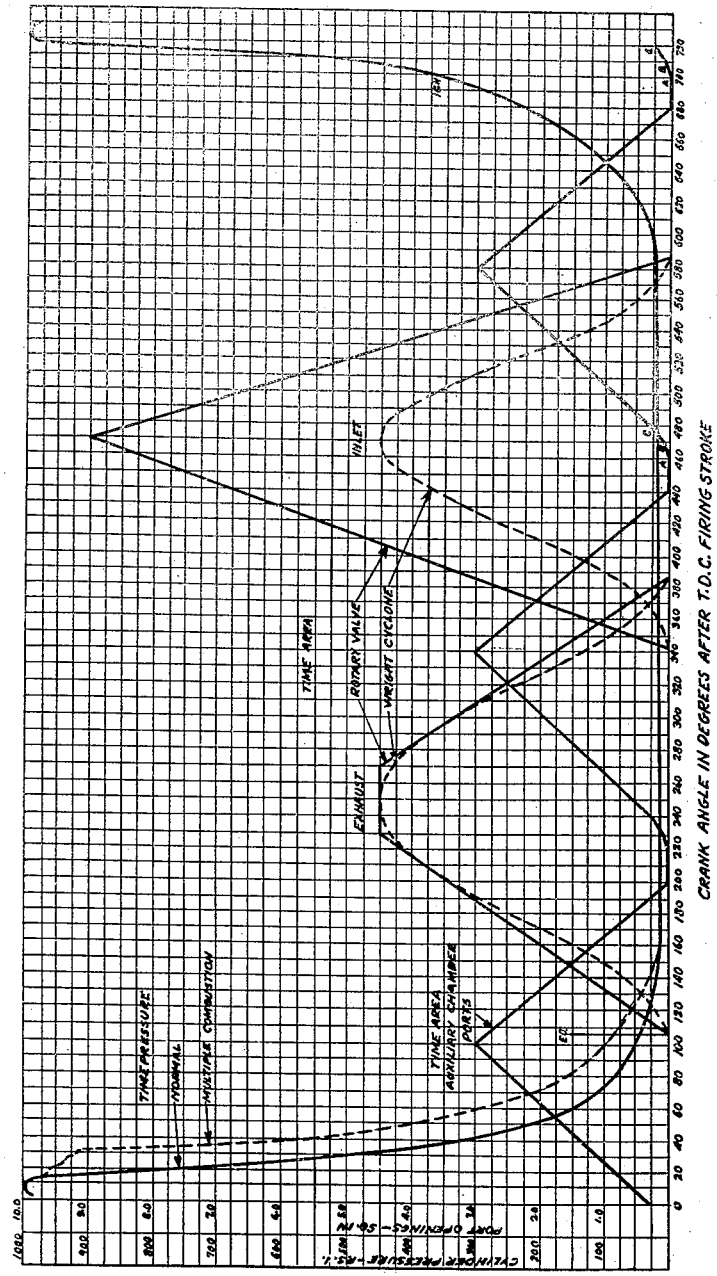

Patented Jan. 19, 1943

2,308,839

UNITED STATES PATENT OFFICE 2,308,839

INTERNAL COMBUSTION ENGINE

William D. Tipton, Stoneleigh, Md.

Application September 21, 1942, Serial No. 459,164

21 Claims. (Cl. 123—190)

This invention relates to rotary valve internal combustion engines.

The many advantages of rotary over reciprocating valves for internal combustion engines have been known in the art for many years. As set forth in prior patents of the present inventor, No. 2,158,442, dated May 16, 1939, and No. 2,216,057, dated September 24, 1940, these advantages include more positive actuation, greater accuracy in timing, fewer operating parts, ease of adjustment, reduced size and weight per horse power, elimination of hot spots and avoidance of pre-ignition. Many of these advantages are becoming more and more compelling, particularly in conjunction with aircraft engines, as demands upon their power output and speed of operation are increased.

It is now sought to combine these advantages of rotary valve actuation with the principles of multiple combustion in such a manner as to retain the most desirable inherent characteristics of each. By the use of supplemental or auxiliary combustion chambers which are caused to communicate with the main combustion chamber after ignition has occurred, peak pressures can be reduced with a corresponding decrease in shock, the duration of the reduced peak pressures can be increased resulting in the application of appreciable forces at more effective crank angles, and the power and efficiency of an engine of given size and weight can be increased.

In applying the engine of the present invention to aircraft propulsion particularly, the desirability of maximum power for take-off and maximum efficiency at partial throttle or cruising speed has received considerable attention. These results can be more nearly achieved by reducing the volume of the auxiliary combustion chamber or chambers at partial throttle, thus increasing the expansion ratio, and thereby increasing the value of thermal efficiency as expressed in the relationship based upon the well known Otto cycle.

In accordance with the objects of this invention, an internal combustion engine will have each cylinder provided with a piston to define a combustion chamber with which one or more auxiliary combustion chambers cooperate, together with rotary valve means controlling the passage of fluid to and from the combustion chambers. Rotary valves for the main and auxiliary combustion chamber may be independent, integral or coupled. Adjustable means for controlling the passage of fluid between the combustion chambers is likewise contemplated in conjunction with the valve means in some instances, while means for varying the volume of one or more auxiliary combustion chambers is proposed in others. Where automatic control of auxiliary combustion chamber volume is preferred, it may be rendered responsive to absolute inlet manifold pressure. When a plurality of auxiliary combustion chambers are employed, they may be made to communicate in stages, singly or in groups, with the main combustion chamber by appropriate timing. The valve or valves for this engine may be provided with sealing means responsive to combustion chamber pressures, and such valves may assume the form of the so-called "cuff" type having an outwardly divergent periphery. The main valve may be fitted with a replaceable element to determine the volume of the combustion chamber. Moreover, the auxiliary combustion chamber or chambers may be supported by the valve itself where such disposition is preferred to mounting upon or within the cylinder walls or head. The valve or valves are preferably lubricated in such a way as to take advantage of centrifugal forces in distributing the lubricant. The valve or valves may be driven by gearing applied near the head of the respective cylinder to avoid as far as possible the adverse effects of heating.

A more complete understanding of the present invention and its objects will follow from a detailed description of the accompanying drawings wherein:

Fig. 6 is a sectional elevation showing still another modification;

Fig. 7 is a diagrammatic representation of a portion of an operating gear;

Fig. 8 is a diagrammatic showing of additional operating gear; and

Fig. 9 is a curve sheet illustrating the timing and performance of an engine conforming to the present invention.

Figure 1:
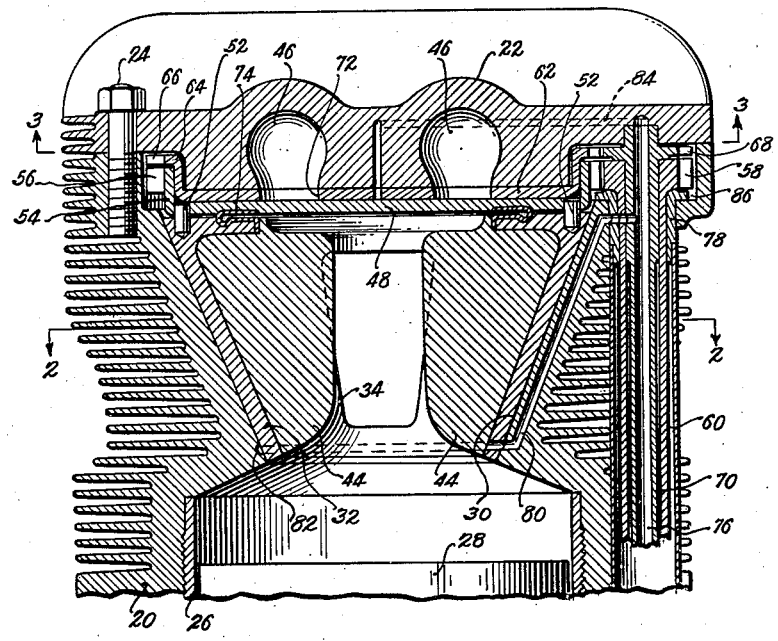
Fig. 1 is a sectional elevation, partially broken away, of a cylinder embodying certain features of the present invention.

The portion of an engine shown in Fig. 1 includes a finned cylinder 20 having a finned head 22 attached thereto by means of suitable bolts 24. A cylinder sleeve 26 is threaded into the cylinder for reception of a piston 28 which reciprocates therein. The outer end of the cylinder is provided with an outwardly divergent frustoconical seat 30 into which is fitted a rotary valve 32 having a periphery complementing the seat. The valve is provided with opposed ports 34 and 36 designed for registry with opposed cylinder inlet ports 38 and 40, and a cylinder exhaust port 42.

Figure 3:
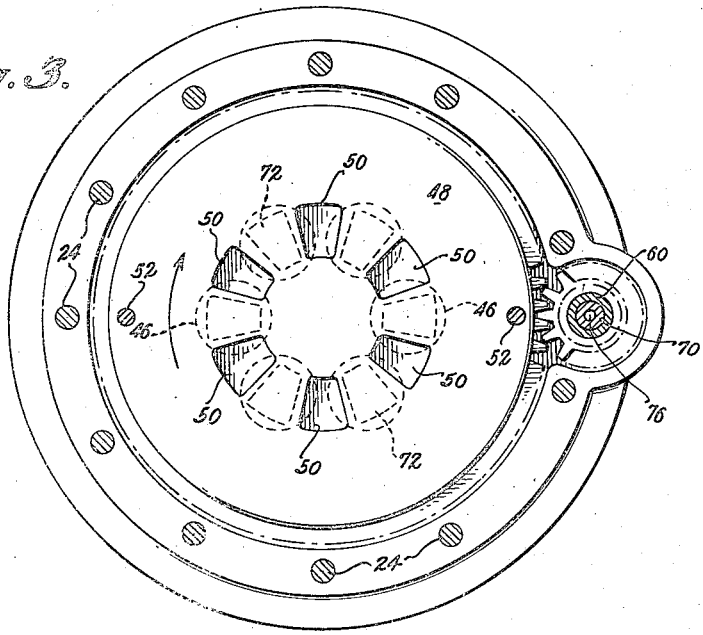
Fig. 3 is a section taken along line 3—3 of Fig. 1.

The rotary valve 32 is fitted with one or more filler blocks 44 which are changeable to permit variation of the compression ratio without necessitating the replacement of any of the major parts of the engine. The cylinder head is shown as containing a plurality of auxiliary combustion chambers 46, the number and volume of which may be selected in accordance with the desired characteristics of the engine. As depicted in Figs. 1 and 3 of the drawings for purposes of this description however, six such auxiliary chambers have been depicted, having an aggregate volume approximating one-third of the total combustion chamber volume. Since it is desirable to maintain the maximum usable compression pressure at cruising power for aircraft engines, which is usually from about 50% to about 60% full power, it may be desirable to design the volume of these auxiliary chambers so that when deducted from the total combustion chamber volume, there remains such a volume as will provide maximum compression pressures at the most desirable cruising power factor. Such design will provide a maximum expansion ratio for cruising purposes, and since efficiency of an internal combustion engine is a function of the expansion ratio, it will follow that an increased efficiency may be effected by thus increasing the compression ratio.

Communication between the auxiliary combustion chambers and the main combustion chamber is controlled in timed relationship by means of a valve 48, generally of the disk type, superposed upon the main valve 32 and containing a plurality of ports 50, corresponding in number to the number of auxiliary combustion chambers, depicted as broken circles in Fig. 3 of the drawings. The disk valve 48 is coupled to the cuff valve 32 by means of an appropriate number of pins 52 fitted into registering apertures formed in the opposed surfaces of the two valves. The periphery of the disk valve is provided with an outwardly directed annular flange 54 on which gear teeth 56 are formed for cooperation with a pinion 58 carried by a hollow shaft 60 which is driven in synchronism with the engine crank shaft in the manner diagrammatically represented in Fig. 7 of the drawings.

Interposed between the cylinder head 22 and the disk valve 48, there is provided a second disklike valve 62, likewise having an outwardly directed annular flange 64 provided with teeth 66 for engagement with the teeth of a pinion 68 carried by a hollow shaft 70 which extends through the hollow shaft 60 and which may be actuated manually or automatically in a manner to be described. The disk-like valve 62 is likewise provided with a plurality of ports 72 corresponding in number to the number of auxiliary combustion chambers. These ports are depicted in broken lines as having a trapezoid-like outline in Fig. 3 of the drawings.

In order to seat the cuff valve 32 and the disk valve 48 in response to combustion chamber pressures with a force sufficient to prevent leakage, an expansible substantially U-shaped sealing element 74 is interposed between the adjacent faces of the two valves. This sealing element may be designed with respect to the seating areas of the valves to produce the most desirable bearing pressure of the valves upon their seats. Thus, the sealing element may be designed to produce forces upon the valves just sufficient to prevent leakage of the gases and thereby avoid excessive friction between the valves and their seats. It will be noted that the sealing element is arranged between two members which rotate together and accordingly is subjected to no mechanical wear.

In lubricating the valves of the construction shown in Fig. 1, advantage is taken of the centrifugal force developed by their rotation. Oil is fed from the crankcase or other suitable source through the bore 76 of the hollow shaft 70 to portions of the valves approaching their axes. In the case of the cuff valve 32, oil from the bore of shaft 70 passes through registering transverse ports penetrating the walls of the inner shaft 70, the outer shaft 60 and the bearing 78 for the outer shaft, to a bore 80 provided in the cylinder wall, which terminates in a groove 82 communicating with the face of the cuff valve near its reduced end. Upon rotation of the valve, lubricant will flow outwardly due to centrifugal force until it reaches the pinions 58 and 68, whereupon it will flow along the outer surfaces of the shafts 60 and 70 back towards the crankcase. The outer end of the bore 76 formed in the shaft 70 communicates with a passage 84 provided in the cylinder head to deliver oil substantially centrally of the upper face of the disk valve 48. Here again centrifugal force will distribute the lubricant towards the periphery of the valve into the gear housing 86 and back to the crankcase.

It will follow from the foregoing description that the disk-like valve 62 may be actuated to permit or discontinue communication between the auxiliary combustion chambers and the main combustion chamber. When the ports 72 of this valve register with those of the auxiliary combustion chambers, the full combustion volume of the engine will be utilized to produce full power. On the other hand, when the valve is rotated by means of the shaft 70 to interrupt communication, only the main combustion chamber is utilized, a condition contemplated for cruising in connection with aircraft engines.

Assuming that the disk-like valve 62 is positioned to permit the auxiliary combustion chambers to cooperate with the main combustion chamber, the comparative results will be depicted in the curves of Fig. 9. These curves have been plotted to compare the operation of the engine of the present invention with the operation of the well known Wright Cyclone engine having poppet valves. The time-pressure curves include a full line curve representing the cycle of the standard selected, and a broken line curve illustrating the cycle of the present invention. The time-area curves depict the opening and closing of the poppet valves of the standard engine in broken lines, as compared with the opening and closing of the rotary valves of the present invention in full lines. Also shown on the basis of the time-area relationship is a solid line curve, appropriately identified, illustrating the opening and closing of the auxiliary combustion chamber ports. With reference to the time-area curve for the auxiliary chambers, it will be noted that they are closed to the main chamber five degrees before ignition and remain closed while combustion occurs in the main chamber, whereupon opposed pairs of the auxiliary chambers, indicated by the letters A, B and C, are opened to the main chamber at ten-degree intervals of crankshaft travel and their contents ignited in that sequence. This delayed ignition serves to produce a continuation of the time-pressure curve for combustion as indicated by the broken line curve plotted on the time-pressure coordinates.

The valve of this construction has been geared to rotate at one-fourth crankshaft, so as indicated by the curves, the auxiliary combustion chambers communicate with the main combustion chamber three times in each cycle, one closing occurring at about top dead center on the firing stroke and the other two at the closing of the exhaust port and the opening of the inlet ports. Three closings of the auxiliary chambers have been selected, since two of the closings, not being required for functioning of the auxiliary combustion cycle, will occur at points which will not interfere with the total combustion cycle.

By utilizing a plurality of auxiliary chambers and a corresponding number of valve ports, the ratio of port area to auxiliary chamber volume can be made as great as possible. The modification depicted in Fig. 4 of the drawings contemplates a plurality of auxiliary combustion chambers 88, the volume of which may be adjusted, manually or automatically to conform with desired operating conditions. The disk valve 48, like that of the preceding example, will be driven by a suitable pinion in timed relationship with the crankshaft to effect communication between the auxiliary combustion chambers and the main combustion chamber at the desired intervals. In lieu of the disk-like valve 62 of the preceding example however, this form of the invention utilizes an annular member 90, which is substantially S-shaped in section, provided with external teeth 92 for cooperation with a suitable pinion like pinion 68 of the preceding example, and internal teeth 94 for engagement with teeth 96 formed on the lower ends of sleeves 98 rotatably mounted in sockets 100 formed in the head 102. These sleeves contain the auxiliary combustion chambers which are provided with internal threads 104 extending over a substantial portion of their lengths for cooperation with externally threaded plugs 106. These plugs are longitudinally movable with respect to the sleeves, but maintained non-rotatable with respect thereto by means of splines 108 carried by pins 110 which are held fast with respect to the head by means of keys 112 and nuts 114 threaded upon the ends of the pins. A gear cover plate 116, suitably dowelled to the cylinder head so as to prevent rotation of said cover plate, is interposed between the disk valve 48 and the toothed ends of the sleeves to prevent gas leakage into the gear recesses. It will be evident that upon rotation of the annular member 90, the sleeves 98 will be rotated and the plugs 106 will be advanced or retracted, depending upon the direction of rotation, to reduce or enlarge respectively, the volume of the auxiliary combustion chambers.

Figure 4:
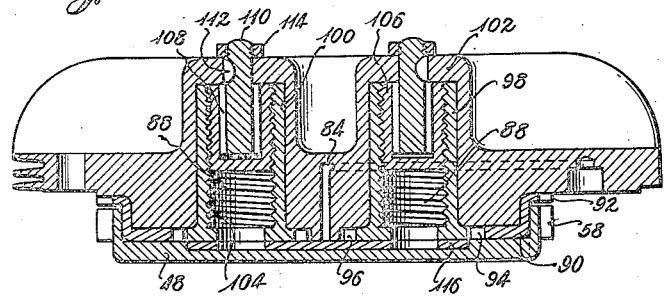
Fig. 4 is a sectional elevation of a cylinder head depicting a modification.
Figure 5:
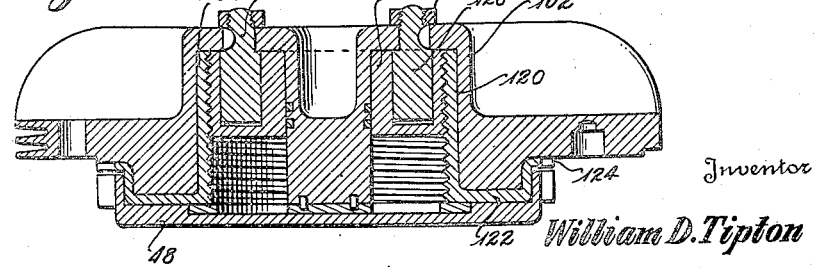
Fig. 5 is a sectional elevation of a cylinder head illustrating another modification.

The provision of a single auxiliary combustion chamber having an adjustable volume is illustrated in Fig. 5 of the drawings. In this case, the head 102 is formed with an annular recess 118 containing an internally threaded sleeve 120, having a flange 122 at its inner end terminating in teeth 124 which correspond with the teeth 92 described in connection with Fig. 4 of the drawings. An annular plug 126 is externally threaded for cooperation with the sleeve 120 so that it may be advanced or retracted by rotation of the sleeve. The plug is restrained against rotation by a plurality of pins 128 secured in the head by nuts 130.

It will be understood that the head assemblies of Figs. 1, 4 and 5 may be interchanged with one another to cooperate with a main combustion chamber and rotary valve of the type illustrated in Fig. 1.

In Fig. 7 of the drawings, a suitable operating mechanism has been shown diagrammatically. The disk valve 48 and its gearing is driven by the hollow shaft 60, the lower end of which terminates in a bevel gear 132 which engages a cooperating bevel gear 134 which is loosely mounted for rotation upon the crankshaft 136. The bevel gear 134 is driven at the desired reduced rate with respect to the crankshaft by means of a spur 138 keyed to the crankshaft, through cooperating gears 140 and 142. The pinion 68 for driving the disk-like valve of Fig. 1 or the gears of Figs. 4 or 5 is mounted on the shaft 70 whose lower end carries a bevel gear 144 engaging with a bevel gear 146 loosely journalled on the crankshaft 136. A control element 148 is connected through a link 150 to a point on the bevel gear 146 to produce the desired rotation.

Where automatic control of the auxiliary combustion chambers is contemplated, it may be preferable that the volume of these chambers be varied directly as a function of absolute manifold pressure which will render the actuation independent of atmospheric pressure and altitude. This may be accomplished by apparatus of the type disclosed in Fig. 8 of the drawings wherein the bevel gear 146 through the link 150 is connected with a piston 152 which is received in a cylinder 154. One side of the piston is loaded by a spring 156 while the other surface is subjected to engine oil pressure admitted through an inlet 158. The end of the cylinder which receives the oil is provided with a partition 159 through which a follow-up tube 162 extends in fluid-tight relationship by means of suitable packing. The follow-up tube also extends through the opposite end of the cylinder where it is also provided with suitable fluid-tight packing and thence to an aneroid control device 170. The partition 160 prevents the egress of oil except through the open end of the follow-up tube 168 which is normally closely adjacent the piston 152. When the engine is running, the oil entering the cylinder will move the piston 152 against the force of the spring 156 and flow through the end of the follow-up tube of the servomotor to a transverse port 172 provided in the tube on the opposite side of the partition and through an outlet 174 in the cylinder to a suitable reservoir. Thus it will be clear that the piston will automatically position itself at a slight distance from the end of the follow-up tube.

The aneroid control 170 includes a piston 176 received in a cylinder 178, subjected to inlet manifold pressure on one side through a port 180 provided in the cylinder and to the force of a spring 182 enclosed in an evacuated closed bellows 184 on the other side. Accordingly, the piston 176 of the aneroid control will respond to the absolute manifold pressure to adjust the follow-up tube 168 so that the piston 152 of the hydraulic booster will always follow the motion of the piston 176 and impart this motion to the bevel gear 146 and ultimately to the control of the auxiliary combustion chambers themselves.

In the modification shown in Fig. 6 of the drawings, the auxiliary combustion chamber or chambers 186 will be formed in the filler block

44 carried by the valve 32. In this case, a valve plate 188 is held against rotation by the head 190 and is provided with a suitable number of ports, not shown, to time communication between the main combustion chamber and the auxiliary combustion chamber or chambers. A sealing element 192 is interposed between the valve plate and the head to impose pressures of a desired magnitude between the valve plate 188 and its seat on the valve 32 on the one hand and between valve 32 and its seat on the cylinder wall on the other. The valve 32 is driven by a gear 194 from a pinion, not shown, similar to the pinion 58 of Fig. 1, the gear 194 being looosely splined or otherwise coupled to the outer end of the valve to permit some freedom of movement to compensate for expansion due to heating.

Figure 2:
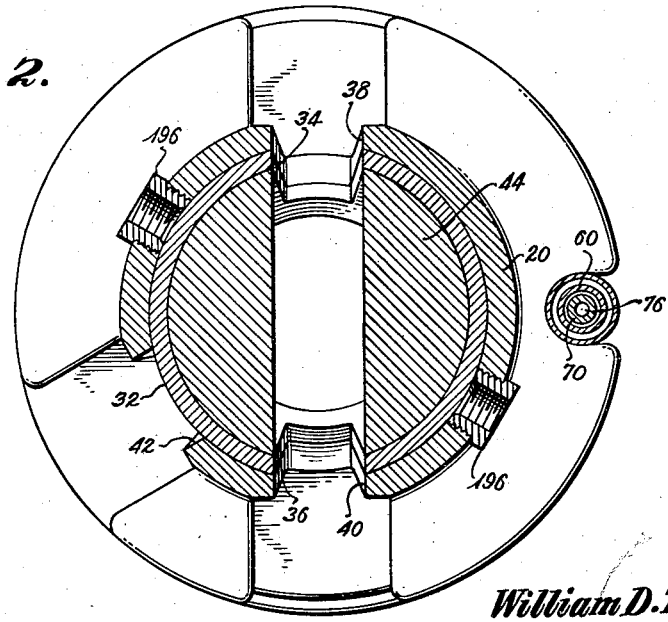
Fig. 2 is a section taken along line 2—2 of Fig. 1.

Upon reference to Fig. 2 of the drawings, it will be noted that bushings 196 for the reception of spark plugs are located at the side of the combustion chamber so as to be masked by the valve until the ignition point has been reached, whereupon they will be uncovered. Being thus exposed to combustion temperatures for short periods only, the spark plugs will be maintained at minimum temperatures. Also shown in this figure are twin inlet ports diametrically opposed and a single exhaust port. Only one exhaust port has been shown to simplify manifolding, and consequently the port has been made sufficiently large to satisfy operating requirements. Its time-area curve as shown in Fig. 9 of the drawings, conforms substantially to that of the standard engine. On the other hand, the time-area curve for the intake ports indicates considerably more area than is made available by the poppet valve design of the standard selected.

From the foregoing description, various additional modifications have suggested themselves to the inventor and some of these may likewise occur to others skilled in the art. Accordingly, it should be borne in mind that the real scope of the invention is to be measured not by these examples but by the appended claims.

I claim:

1. An internal combustion engine comprising a cylinder having a piston fitted therein to define a combustion chamber, an auxiliary combustion chamber periodically closed with respect to said combustion chamber, and rotary valve means between said chambers and controlling the passage of fluid to and from said cylinder and said auxiliary combustion chamber.

2. An internal combustion engine comprising a cylinder having a piston fitted therein to define a combustion chamber, an auxiliary combustion chamber cooperable with said combustion chamber, and rotary valve means between said chambers and controlling the passage of fluid between, to and from said cylinder and said auxiliary combustion chamber.

3. An internal combustion engine comprising a cylinder having a piston fitted therein to define a combustion chamber, an auxiliary combustion chamber cooperable with said combustion chamber, rotary valve means controlling the passage of fluid to and from said cylinder and said auxiliary combustion chamber, and adjustable means independent of said valve means for controlling the passage of fluid between said cylinder and said auxiliary combustion chamber.

4. An internal combustion engine comprising a cylinder having a piston fitted therein to define a combustion chamber, an auxiliary combustion chamber cooperable with said combustion chamber, rotary valve means between said chambers and controlling the passage of fluid between, to and from said cylinder and said auxiliary combustion chamber, and means for varying the volume of said auxiliary combustion chamber.

5. An internal combustion engine comprising a cylinder having a piston fitted therein to define a combustion chamber, an inlet manifold communicating with said cylinder, an auxiliary combustion chamber cooperable with said combustion chamber, rotary valve means controlling the passage of fluid to and from said cylinder and said auxiliary combustion chamber, and means responsive to absolute inlet manifold pressure for varying the volume of said auxiliary combustion chamber.

6. An internal combustion engine comprising a cylinder having a piston fitted therein to define a combustion chamber, a plurality of auxiliary combustion chambers adapted to communicate with said combustion chamber in predetermined sequence, and rotary valve means controlling the passage of fluid to and from said cylinder and said auxiliary combustion chambers.

7. An internal combustion engine comprising a cylinder having a head and a piston fitted therein to define a combustion chamber, an auxiliary combustion chamber cooperable with said combustion chamber, said cylinder providing a valve seat near its head end, a rotary valve fitted to said seat for controlling the passage of fluid to and from said cylinder, and means for controlling fluid passage between said cylinder and said auxiliary combustion chamber.

8. An internal combustion engine comprising a cylinder having a head and a piston fitted therein to define a combustion chamber, an auxiliary combustion chamber cooperable with said combustion chamber, said cylinder providing an outwardly divergent valve seat near its head end, a rotary valve fitted to said seat for controlling the passage of fluid to and from said cylinder, and a rotary valve coupled to the first said valve for controlling fluid passage between said cylinder and said auxiliary combustion chamber.

9. An internal combustion engine comprising a cylinder having a head and a piston fitted therein to define a combustion chamber, an auxiliary combustion chamber cooperable with said combustion chamber, said cylinder providing an outwardly divergent valve seat near its head end, rotary valve means between said chambers and fitted to said seat for controlling the passage of fluid to and from said cylinder and said auxiliary combustion chamber, and sealing means responsive to combustion chamber and auxiliary combustion chamber pressure interposed between said valve and said head.

10. An internal combustion engine comprising a cylinder having a head and a piston fitted therein to define a combustion chamber, an auxiliary combustion chamber cooperable with said combustion chamber, said cylinder providing an outwardly divergent valve seat near its head end, a rotary valve fitted to said seat for controlling the passage of fluid to and from said cylinder, a rotary valve superposed upon the first said valve for controlling fluid passage between said cylinder and said auxiliary combustion chamber, and sealing means responsive to combustion chamber pressure interposed between said valves.

11. An internal combustion engine comprising a cylinder having a head and a piston fitted therein to define a combustion chamber, said cylinder providing an outwardly divergent valve seat near its head end, a rotary valve fitted to said seat for controlling the passage of fluid to and from said cylinder, and a replaceable element received by said valve to determine the volume of said combustion chamber.

12. An internal combustion engine comprising a cylinder having a piston fitted therein to define a combustion chamber, an auxiliary combustion chamber cooperable with said combustion chamber, a rotary valve for controlling the passage of fluid to and from said cylinder, a second rotary valve for controlling the passage of fluid to and from said auxiliary combustion chamber, and a third valve for establishing and discontinuing communication between said combustion chambers.

13. An internal combustion engine comprising a cylinder having a piston fitted therein to define a combustion chamber, an auxiliary combustion chamber cooperable with said combustion chamber, and rotary valve means supporting said auxiliary combustion chamber and controlling the passage of fluid to and from said cylinder and said auxiliary combustion chamber.

14. An internal combustion engine comprising a cylinder having a head and a piston fitted therein to define a combustion chamber, a plurality of auxiliary combustion chambers carried by said head and cooperable with said combustion chamber, and rotary valve means controlling the passage of fluid to and from said cylinder and said auxiliary combustion chambers.

15. An internal combustion engine comprising a cylinder having a piston and a rotary valve fitted therein to define a combustion chamber, said rotary valve controlling the passage of fluid to and from said cylinder, and an auxiliary combustion chamber carried by said valve for cooperation with said combustion chamber.

16. An internal combustion engine comprising a cylinder having a piston and rotary valve means fitted therein to define a combustion chamber, and an auxiliary combustion chamber carried by said valve means and cooperable with said combustion chamber, said rotary valve means controlling the passage of fluid to and from said cylinder and said auxiliary combustion chamber.

17. An internal combustion engine comprising a cylinder having a head, a piston and a rotary valve fitted therein to define a combustion chamber, an auxiliary combustion chamber carried by said valve and cooperable with said combustion chamber, said rotary valve between said chambers and controlling the passage of fluid to and from said cylinder and said auxiliary combustion chamber, and sealing means responsive to combustion chamber and auxiliary combustion chamber pressure interposed between said valve and said head.

18. An internal combustion engine comprising a cylinder having a head and a piston fitted therein to define a combustion chamber, an auxiliary combustion chamber cooperable with said combustion chamber, said cylinder providing an outwardly divergent valve seat near its head end, rotary valve means between said chambers and fitted to said seat, and controlling the passage of fluid to and from said cylinder and said auxiliary combustion chamber, means for driving said valve means adjacent its outer end and means for delivering lubricant to said valve means at a point near its smaller end.

19. An internal combustion engine comprising a cylinder having a head and a piston fitted therein to define a combustion chamber, an auxiliary combustion chamber carried by said head and cooperable with said combustion chamber, said cylinder providing an outwardly divergent valve seat near its head end, said head providing a valve seat for said auxiliary combustion chamber, rotary valves fitted to said seats for controlling the passage of fluid to and from said cylinder and said auxiliary combustion chamber, and driving means for said valves engaged therewith near the head end of said cylinder.

20. An internal combustion engine comprising a cylinder having a piston fitted therein to define a combustion chamber, an auxiliary combustion chamber cooperable with said combustion chamber, rotary valve means controlling the passage of fluid to and from said cylinder and said auxiliary combustion chamber, and means for introducing lubricant to said valve means at a point of relatively small diameter so that the lubricant will be distributed by centrifugal force upon rotation of said valve means.

21. An internal combustion engine comprising a cylinder having a head, a piston and a rotary valve fitted therein to define a combustion chamber, an auxiliary combustion chamber adjacent to and cooperable with said combustion chamber, said rotary valve controlling the passage of fluid to and from said cylinder and said auxiliary combustion chamber, and sealing means responsive to combustion chamber and auxiliary combustion chamber pressure interposed between said valve and said head.

WILLIAM D. TIPTON.